United States Patent
Risse et al.

(10) Patent No.: US 8,543,278 B2
(45) Date of Patent: Sep. 24, 2013

(54) OPERATING DEVICE AND METHOD FOR TRAILER VEHICLES

(75) Inventors: Rainer Risse, Pattensen-Reden (DE); Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 395 days.

(21) Appl. No.: 12/310,264

(22) PCT Filed: Jul. 5, 2007

(86) PCT No.: PCT/EP2007/005941
§ 371 (c)(1),
(2), (4) Date: Feb. 17, 2009

(87) PCT Pub. No.: WO2008/022666
PCT Pub. Date: Feb. 28, 2008

(65) Prior Publication Data
US 2009/0326755 A1 Dec. 31, 2009

(30) Foreign Application Priority Data

Aug. 24, 2006 (DE) .......................... 10 2006 039 765

(51) Int. Cl.
*G01M 17/00* (2006.01)
(52) U.S. Cl.
USPC ........................................ 701/29.1; 340/5.54

(58) Field of Classification Search
USPC ................... 701/1, 29, 29.1, 29.11; 340/5.54
See application file for complete search history.

(56) References Cited

U.S. PATENT DOCUMENTS

| | | | |
|---|---|---|---|
| 5,940,007 A * | 8/1999 | Brinkmeyer et al. | 340/12.29 |
| 6,970,772 B2 * | 11/2005 | Radtke et al. | 701/1 |
| 7,171,289 B1 * | 1/2007 | Tamez et al. | 701/1 |
| 7,926,832 B1 * | 4/2011 | Hall | 280/441.2 |
| 2004/0093143 A1 * | 5/2004 | Fry | 701/70 |
| 2005/0127747 A1 * | 6/2005 | Robertson | 303/20 |
| 2005/0270148 A1 * | 12/2005 | Modawell et al. | 340/445 |
| 2009/0212905 A1 * | 8/2009 | Batz et al. | 340/5.54 |
| 2010/0152920 A1 * | 6/2010 | McCann | 701/2 |

FOREIGN PATENT DOCUMENTS

| | | | |
|---|---|---|---|
| DE | 199 05 172 A1 | 8/2000 | |
| DE | 10 2004 037 707 B4 | 2/2006 | |
| GB | 2 390 347 A | 1/2004 | |
| WO | WO2006015746 * | 2/2006 | 701/2 |

* cited by examiner

*Primary Examiner* — Thomas Black
*Assistant Examiner* — Shardul Patel
(74) *Attorney, Agent, or Firm* — Kramer Levin Naftalis & Frankel LLP

(57) ABSTRACT

An operating device for trailer vehicles includes an operating element for performing a control function of the trailer vehicle and a display for displaying control information corresponding to the control function.

15 Claims, 4 Drawing Sheets

(a)

(b)

OPERATING DEVICE AND METHOD FOR TRAILER VEHICLES

FIELD OF THE INVENTION

The present invention generally relates to an operating device and method for trailer vehicles.

BACKGROUND OF THE INVENTION

Trailer vehicles ("trailers") now have diverse operating functions that are controlled by means of operating devices. The functions to be controlled may be, among many others, an electronic brake system (EBS), trailer central electronics (TCE) or the electronically controlled air suspension system (ECAS). Within the scope of these operating functions, numerous respective control functions are executed.

Heretofore, various individual elements such as switches, lamps, bistable flip-flop elements and simple displays have been used to present and control different operating functions. The many different elements can lead to high costs, since a separate housing as well as lines and plug connectors must be supplied for each element.

It frequently happens that a single, specific control function is assigned to a switch, for example. Conventionally, to ensure that the operating devices can be clearly understood and, thus, used easily for operator control, they are limited to specific operating or control functions. Thus, the conventional operating devices can be adapted to only a limited extent to altered control tasks. In addition, increased complexity is intentionally avoided with conventional operating devices, so that persons without prior knowledge can be introduced to operator control more easily. Nevertheless, conventional operating devices offer little intuitively learnable operating capability. Training sessions are typically required in order to impart understanding of the function of the operating elements (e.g., pushbuttons, etc.) arranged on the operating device, and they must be repeated regularly in the case of changes in the control electronics or of differently equipped trailers.

In addition to the control of operating functions, certain functions and operating parameters of trailers must be monitored in order to offer increased driving comfort and/or increased safety. Examples include monitoring of tire pressures, of mileage or of brake-lining wear. If defects or deviations are detected, they typically cause an indicator lamp to go on, and any error may be permanently stored in the control electronics for diagnostic purposes. Operating data of the operating parameters to be monitored are presented on separate display devices that are physically separate from the operating devices used for control.

SUMMARY OF THE INVENTION

Generally speaking, it is an object of the present invention to provide a universal operating device that permits intuitive and flexible control and monitoring of control functions and operating parameters of a trailer.

In accordance with embodiments of the present invention, an operating device for trailer vehicles includes an operating element for executing (e.g., activating and/or controlling) a control function of the trailer, wherein the operating device includes a display for presenting control information. The control information relates to the control function or otherwise corresponds to the control function. Advantageously, the control information also contains the control data belonging to the operating function. In order to execute the control functions or operating functions by means of the operating device, appropriate control devices are provided in the trailer. According to embodiments of the present invention, and in contrast to conventional operating devices, not only are operating elements provided for control tasks, but associated data and information necessary for control are additionally presented on a display. As a result, it is possible to provide a universal operating device that can be flexibly adapted to various control and monitoring functions and that permits central monitoring of important functions and data. Depending on the presented values, it is possible to react immediately to parameters to be adjusted or to malfunctions. In accordance with embodiments of the present invention, the operating interface can always be configured in the same way, and the display can point intuitively and interactively to the various functions. In contrast to conventional operating devices, therefore, it is precisely the technical complexity of the operating device that is increased according to the present invention, in order to simplify operator control.

A method for operator control of a trailer according to embodiments of the present invention includes presenting control information and assignment, to an operating element, of a control function of the trailer corresponding to the control information. The information is advantageously presented on the display of the operating device, whereupon the operating elements are configured to execute the corresponding control function. Actuation of the operating element activates the control function or changes to a particular menu item in order to present operating data. Accordingly, it is ensured that a control function corresponding to the illustrated control information is assigned to an operating element. The control information indicates which operating function or control function within an operating function can be selected and executed by means of the operating element. However, the control information may also reproduce data needed for control.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangements of parts which are adapted to effect such steps, all as exemplified in the constructions herein set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
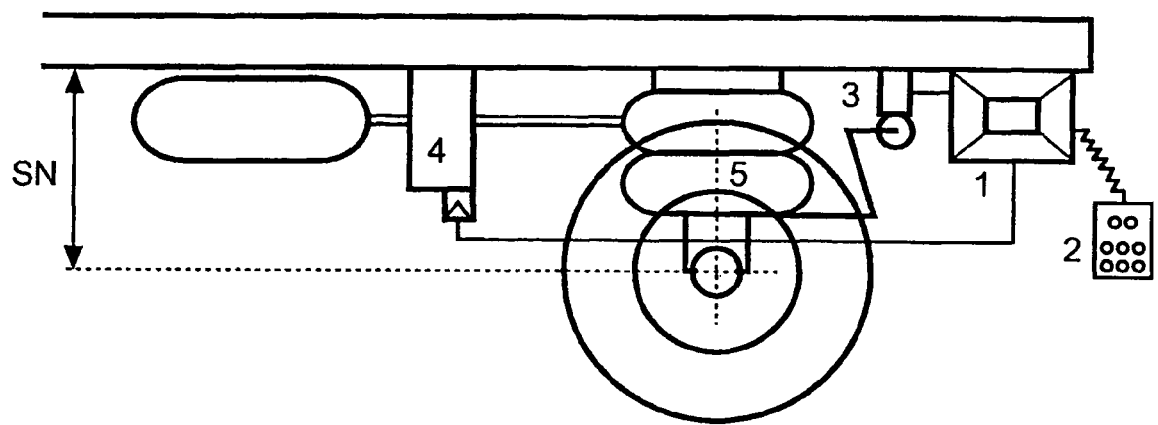
FIG. 1 is a simplified diagram of an application with a conventional operating part for level regulation.

In accordance with embodiments of the present invention, an operating device for trailer vehicles includes an operating element for executing (e.g., activating and/or controlling) a control function of the trailer, wherein the operating device includes a display for presenting control information. The control information relates to the control function or otherwise corresponds to the control function. Advantageously, the control information also contains the control data belonging to the operating function. In order to execute the control functions or operating functions by means of the operating device, appropriate control devices are provided in the trailer. According to embodiments of the present invention, and in contrast to conventional operating devices, not only are operating elements provided for control tasks, but associated data and information necessary for control are additionally presented on a display. As a result, it is possible to provide a universal operating device that can be flexibly adapted to various control and monitoring functions and that permits central monitoring of important functions and data. Depending on the presented values, it is possible to react immediately to parameters to be adjusted or to malfunctions. In accordance with embodiments of the present invention, the operating interface can always be configured in the same way, and the display can point intuitively and interactively to the various functions. In contrast to conventional operating devices, therefore, it is precisely the technical complexity of the operating device that is increased according to the present invention, in order to simplify operator control.

According to an advantageous embodiment of the present invention, at least two different control functions can be executed by the operating device, the display presenting control information corresponding to the respective control function. Advantageously, the operating device is therefore equipped with a type of multi-function display, so that the operating element disposed on the operating device can execute different functions depending on mode of operation. This permits particularly simple and intuitive operator control as well as flexible adaptability of the operating device to various requirements.

According to one advantageous embodiment, the control functions belong to a single operating function, such as, for example, electronic level regulation of the trailer.

According to another advantageous embodiment, the control functions belong to different operating functions of the trailer. For example, manual control of the position of a built-in lift axle of the trailer is executed with a first control function and control of a road finisher brake of the trailer is effected with a second control function at a different time. Accordingly, such different control functions are advantageously provided in an inventive operating device.

In a further advantageous embodiment of the inventive operating device, an operating element (such as, for example, a pushbutton or the like) is designed to execute at least two different control functions upon actuation on the basis of the control information presented on the display. The control functions can belong to the same or different modes of operation or operating functions. The operating elements can then be variably defined, for example via a setting in the operating software of the control electronics of the operating device. Thereby, the necessary flexibility and technical diversity can be achieved despite simple intuitive operating capability. The displays and the operating elements are advantageously disposed and set up such that it is immediately obvious which function the operating element activates or controls when it is actuated.

In another advantageous embodiment of the present invention, the operating device is provided with fewer than ten operating elements. Thereby, the operating device is more clearly understandable and learning of operator control is simplified. If only three operating elements are provided, particularly intuitive functionality is achieved, which is sufficient to execute most functions necessary in the trailer area.

According to yet a further advantageous embodiment of the present invention, the executable control functions can be configured on the basis of those control devices of the trailer that are coupled to the operating device. This means that the operating device advantageously offers or presents only those control functions that are also present in the connected trailer. As a result, operator control is simplified, although the operating device also has the capability in principle to offer numerous different control functions if a trailer is provided with a plurality of control capabilities. This is possible, for example, by automatic querying or communication of system parameters that contain the respective configuration of the trailer. The operating device can be set or even programmed for the respective application via an electronic bus system, to which the operating device is connected. The operating parameters are loaded via the bus, for example during initialization.

According to a still further embodiment of the present invention, the display of the operating device is configured to present operating data assigned to monitoring of operating parameters. Accordingly, the display can present data or information that do not correspond specifically to any control function of the trailer but serve only for monitoring of operating parameters. Thereby, monitoring and diagnostic functions not directly related to control are also provided in addition to the control tasks. For example, presentation of brake-lining wear may be provided in addition to level regulation as a control task. Also, monitoring and control tasks are provided compactly and conveniently in one unit, thus reducing the complexity and costs of the entire equipment.

Examples of further operating data that may be presented on the display of the operating device are the mileage of the trailer, tire pressure information and/or the data of a general operating data memory (operating data recorder).

According to yet another embodiment of the present invention, the operating device is provided with a memory, in which data can be stored, such as the data contained in the general operating data memory.

Advantageously, one or more of the following functions are provided in the operating device: electronic level regulation of the trailer, manual control of the position of a built-in lift axle of the trailer, control of a road finisher brake of the trailer and control of switching outputs for lights, especially the interior lights of the trailer. The inventive operating device can be flexibly adjusted in particular to the above functions, and it offers the respective necessary presentations and corresponding operating elements.

A road finisher brake is used for braking dumpster vehicles during operation behind road finishers. The dumpster vehicle containing tar is pushed forward by the finisher. In order to prevent the vehicle from rolling away, it is lightly braked. The brake pressure can be parameterized. If the corresponding control function is to be activated, conventionally, a separate pushbutton must be actuated, the speed must be slower than 10 km/h and the dumpster body must be raised. For this purpose, a limit switch is provided on the dumpster body. The function is deactivated once again via the separate pushbutton and if the speed exceeds 10 km/h. Only one digital input is needed for this function, since the separate pushbutton and the limit switch are connected in series. According to an advantageous embodiment of the present invention, the control functions are provided in the inventive operating device.

Referring now to the drawing figures, FIG. 1 is a simplified diagram of a conventional application of an operating part 2 for vehicle level regulation. In this case a displacement sensor 3 continuously senses the vertical position of the vehicle and communicates the measured values to electronics 1. If, after evaluation of the signals, the electronics detect a deviation from a specified level SN, a solenoid valve 4 is activated such that the necessary level change is achieved by admission or venting of air. Via operating unit 2, the operator can change the specified level SN below a predetermined speed threshold (while stationary). This is important for ramp operation, for example. Any level outside the level specified for driving operation (normal level) is indicated by a signal lamp. This lamp flashes to signal a system error detected by the electronics.

Figure 2:
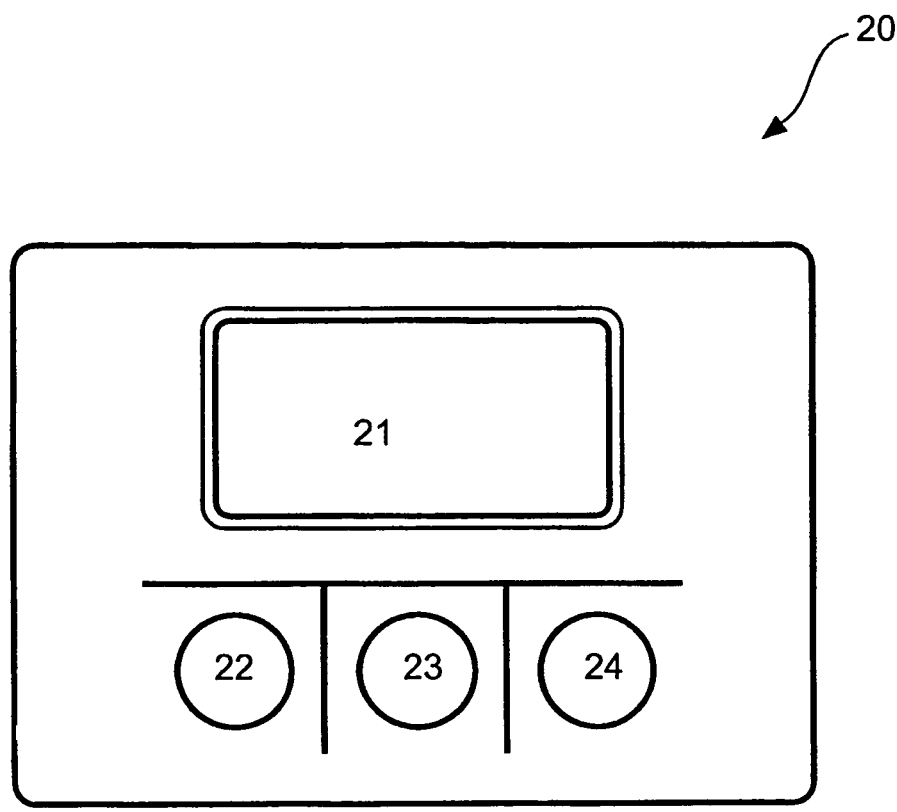
FIG. 2 is a front view of a display and operating device in accordance with an embodiment of the present invention.

FIG. 2 is a front view of an operating device 20 according to an embodiment of the present invention. Operating device 20 is provided with a display 21, in order to illustrate the different functions and modes of operation of the device 20. As an example, the display can have the form of a liquid-crystal display or else as any other kind of display. It is also advantageous to use a matrix display. By means of display 21, the user learns which mode of operation is in effect and which functions are correspondingly available. Upon actuation (for example, by being touched, depressed or the like), operating elements 22, 23 and 24 can execute variable or preset functions, such as entering a menu or returning from a lower menu item to a higher menu item. Likewise, the operating elements can be used to activate control functions, such as turning on the interior lights in a trailer or setting the specified level for level regulation. In this way, the inventive device is advantageously kept particularly simple, so that operator control can be undertaken without laborious additional training of the operating personnel (such as, for example, vehicle drivers). Therefore, according to embodiments of the present invention, operator control is menu-driven and the user can move through the menu presented on display 21 by means of fewer operating elements (such as, for example, ten pushbuttons or fewer). As an example, only three operating elements 22, 23 and 24 are provided in a further advantageous embodiment. On the other hand, certain constantly recurring basic functions can be logically combined directly with one of the operating elements 22, 23 or 24.

Figure 3:
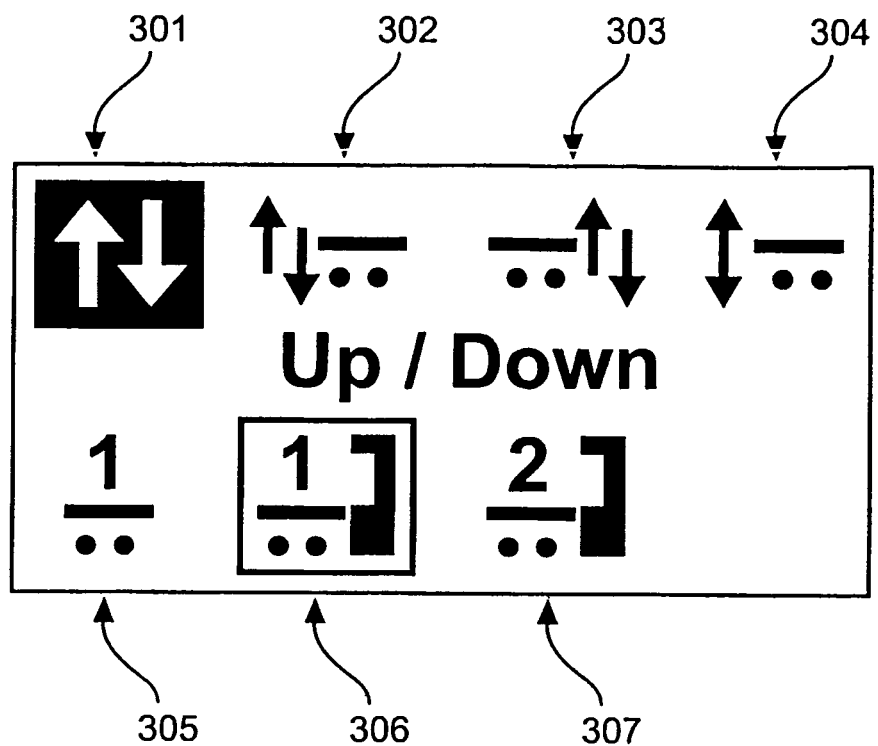
FIGS. 3a and 3b depict exemplary menus in accordance with embodiments of the present invention.
Figure 3:
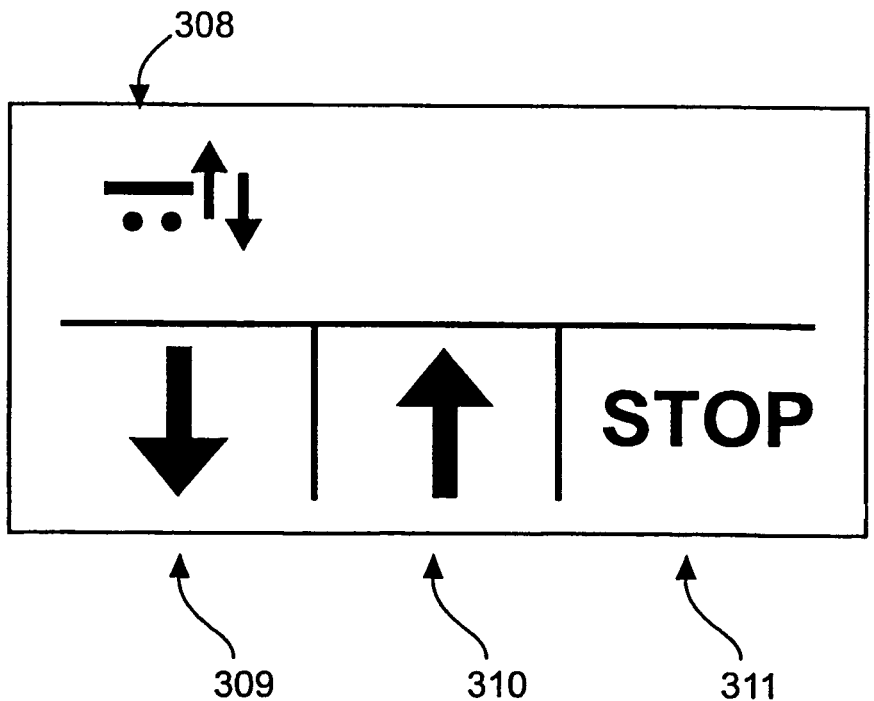

FIGS. 3(a) and 3(b) depict examples of two inventive menus such as can be presented on display 21 according to FIG. 2. These menus can be used, for example, for automatic level regulation of commercial vehicles having pneumatic suspension. Via inventive operating unit 20, the settings of the level regulating systems can be modified selectively, and the functions can be presented on display 21, for example, in the form illustrated in FIG. 3. After completion of the modification, the level is stored as the new specified level. In addition, the automatic level regulating system takes over still more functions, such as automatic upper and lower limitation of vertical position, improvement of lateral stability, level and pressure monitoring, fault detection and display, raising and lowering of lift axles, loading and unloading of the trailing axle, starting assistance, setting the default position of raising or lift axles, and storage and retrieval of freely selectable levels with the operating unit, all functions being presented appropriately on display 21. In order to satisfy this plurality of functions, display 21 can be changed as illustrated—merely by way of example—in FIGS. 3(a) and (b), respectively. Thus, fields 301 to 307 indicate the possible functions. In the example depicted in FIG. 3(a), the frame around symbol 306 indicates that this function has been selected by means of the operating elements that are also provided on the operating device and that it can be executed next. FIG. 3(b) shows how the menu changes when function 302 from FIG. 3(a) has been selected. Thereupon, only the previous symbol 302 (FIG. 3(a)), now as the symbol 308 (FIG. 3(b)), appears in the upper part of the menu. The functions corresponding to the operating elements (as represented by reference numerals 22, 23 and 24 in FIG. 2) and relating to specific control functions (in this case, for example, to UP, DOWN, STOP) are presented in fields 309, 310 and 311. If one of the other fields 301 to 307 is selected, operating elements 22, 23 and 24 of FIG. 2 are then able to provide other correspondingly assigned functions. This type of menu-driven operator control permits intuitive and therefore flexible and universal applicability of the inventive operating device.

In this regard it is advantageous for the display to present the functions by symbols in the form of pictograms. By selecting suitable, generally understandable pictograms, it is possible to dispense with an otherwise necessary explanation in the form of text, or at least to keep the explanation relatively brief. As a result, the operating device can be provided with uniform operator control, largely regardless of the respective local language.

Figure 4:
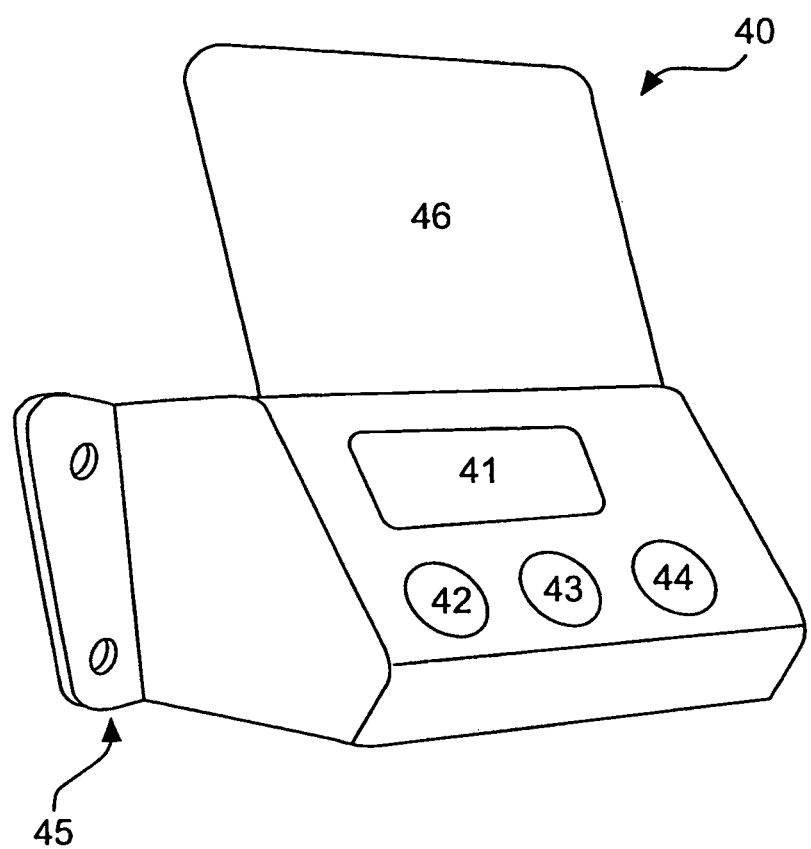
FIG. 4 depicts an example layout of an operating device in accordance with an embodiment of the present invention.

FIG. 4 shows how the components of an inventive operating device can be laid out. According to an embodiment of the present invention, operating device 40 can be installed permanently, for example, on one side of the trailer. Appropriate fastening means 45 are provided for this purpose. However, it is also possible to provide a plurality of such operating devices, for example in the trailer and also in the driver's cab of the tractor. This is particularly practical when the control and monitoring tasks occur in different operating situations. Besides a compact construction and a protective hinged cover 46 in order to protect the operating device from damage, the operating device according to FIG. 4 again has a display 41 and operating elements 42, 43 and 44. It is to be noted that the operating elements do not have to be limited to merely three operating elements as illustrated here. Nevertheless, a small number of operating elements 42 to 44 is advantageous, in that it provides simple operating capability.

In accordance with embodiments of the present invention, the operating device can also be coupled to the trailer via a hard-wired system or via a wireless radio link instead of via a freely movable cable.

A method for operator control of a trailer according to embodiments of the present invention includes presenting control information and assignment, to an operating element, of a control function of the trailer corresponding to the control information. The information is advantageously presented on the display of the operating device, whereupon the operating elements are configured to execute the corresponding control function. Actuation of the operating element activates the control function or changes to a particular menu item in order to present operating data. Accordingly, it is ensured that a control function corresponding to the illustrated control information is assigned to an operating element. The control information indicates which operating function or control function within an operating function can be selected and executed by means of the operating element. However, the control information can also reproduce data needed for control.

An advantageous embodiment of the inventive method includes the additional steps of actuating an operating element for execution of a first control function on the basis of a first presented item of control information, and actuating the (same) operating element for execution of a second control function on the basis of a second presented item of control information, the first control function and the second control function being different. By these steps it is possible to program an operating element in different ways for various control functions within one operating function or even within several operating functions. An operating element is used to execute a first control function on the basis of the presentation of a first item of control information. As soon as a second item of control information is presented, the same operating element is then used to execute a second control function. Thus, one operating element can be advantageously used for a plurality of control functions, the information for this purpose being communicated via the display. This reduces training expense, since a major part of the information necessary for operator control is communicated directly via the display.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. An operating device for a trailer vehicle, comprising:
   a display configured to present control information comprising data required for control of at least one control function of the trailer vehicle, the at least one control function being configured on the basis of control devices of the connected trailer vehicle and being obtainable by at least one of automatic querying and communication of system parameters that contain the configuration of the trailer vehicle; and
   an operating element configured to execute the at least one control function on the basis of the control information presented on the display.

2. The operating device according to claim 1, wherein the operating element is operable to execute at least two different control functions, and the display is operable to present control information comprising data required for control of each of the at least two different control functions.

3. The operating device according to claim 1, wherein the at least one control function comprises trailer level regulation.

4. The operating device according to claim 1, wherein the system parameters are transmitted to the operating device via a bus during initialization.

5. The operating device according to claim 1, wherein the display is operable to present operating data that are assigned to monitoring of operating parameters.

6. The operating device according to claim 1, comprising fewer than ten operating elements.

7. The operating device according to claim 1, wherein the operating element is adapted to effect at least one of:
   operator control of electronic level regulation of the trailer vehicle;
   manual control of the position of a built-in lift axle of the trailer vehicle;
   control of a road finisher brake of the trailer vehicle; and
   control of switching outputs for lights of the trailer vehicle.

8. The operating device according to claim 6, comprising only three operating elements.

9. The operating device according to claim 7, wherein the lights of the trailer vehicle are interior lights.

10. The operating device of claim 1, wherein the at least one control function is configured on the basis of control devices of the connected trailer vehicle that are coupled to the operating device, and wherein the at least one control function is obtained by at least one of automatic querying and communication of system parameters that contain the configuration of the trailer vehicle.

11. The operating device of claim 3, wherein the operating device is located in a cab of a tractor coupled to the trailer vehicle, and wherein the operating element is configured to control the trailer level regulation control function based on the control information presented on the display from inside the cab.

12. A method for operator control of a trailer vehicle, comprising the steps of:
   presenting control information comprising data required for control of a control function of the trailer vehicle on a display of an operating device;
   assigning to an operating element of the operating device the control function of the trailer vehicle corresponding to the control information; and
   continuing to present data required for control of the control function as the operating element is actuated.

13. The method according to claim 12, further comprising the steps of:
   actuating the operating element for execution of the control function on the basis of the control information, and
   actuating the operating element for execution of a second control function on the basis of control information required for control of the second control function, the first control function and the second control function being different.

14. The method according to claim 12, further comprising providing the operating device in a cab of a tractor coupled to the trailer vehicle.

15. The method according to claim 14, wherein the control function comprises at least one of electronic level regulation of the trailer vehicle, manual positioning of a built-in lift axle of the trailer vehicle, and controlling a road finisher brake of the trailer vehicle, and wherein the control function is actuated from the control device provided in the cab based on the control information displayed on the display of the operating device.

* * * * *

UNITED STATES PATENT AND TRADEMARK OFFICE
CERTIFICATE OF CORRECTION

PATENT NO. : 8,543,278 B2  
APPLICATION NO. : 12/310264  
DATED : September 24, 2013  
INVENTOR(S) : Risse et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 397 days.

Signed and Sealed this
Fifteenth Day of September, 2015

Michelle K. Lee
*Director of the United States Patent and Trademark Office*